United States Patent [19]

Carnevale

[11] Patent Number: 5,332,052
[45] Date of Patent: Jul. 26, 1994

[54] DETACHABLE ALL TERRAIN TRAILER

[76] Inventor: Louis Carnevale, P.O. Box 389, Center Moriches, N.Y. 11934

[21] Appl. No.: 962,658

[22] Filed: Oct. 19, 1992

[51] Int. Cl.⁵ ............................................. B62D 61/12
[52] U.S. Cl. .................................... 180/14.2; 180/209
[58] Field of Search ................ 180/14.2, 24.11, 24.06, 180/24.07, 204, 167; 280/705, 418.1

[56] References Cited

U.S. PATENT DOCUMENTS

| | | | |
|---|---|---|---|
| 2,235,175 | 9/1941 | Simpkins et al. | 180/14.2 |
| 3,783,960 | 1/1974 | Feliz | 180/14.2 |
| 4,368,793 | 1/1983 | Igarashi | 180/209 |
| 4,369,855 | 1/1983 | Buschbom et al. | 180/242 |

*Primary Examiner*—Karin L. Tyson

[57] ABSTRACT

A method of transporting commercial cargoes by truck-tractor/semi-trailer over roadways and by self-propelled/remote-controlled semi-trailer in off-road conditions. The self-propelled semi-trailer can disconnect from its pulling truck-tractor and deliver cargoes through all types of off-road terrains or conditions then reconnect and travel over roadways again. A plurality of permanently mounted stationary and/or retractable axles, with non-steerable wheels attached, are mounted at the rear-section of the self-propelled semi-trailer chassis for supporting it during connected or disconnected operating modes. A retractable axle is permanently mounted ahead of the rearward mounted wheel axles for supporting the weight of the front part of the semi-trailer when it is disconnected from its pulling truck-tractor. The retractable forward mounted axle has steerable wheels at either end for steering the semi-trailer in its disconnected operating mode. A engine producing rotational energy is permanently mounted to the semi-trailer chassis. The rotational energy is coupled to one or more of the semi-trailer permanently mounted stationary and retractable axle wheels causing the semi-trailer to be self-propelled at variable speeds in either forward or reverse direction. A radio-control system is used to remotely control all functions of the self-propelled semi-trailer including its detaching/attaching operation.

2 Claims, 5 Drawing Sheets

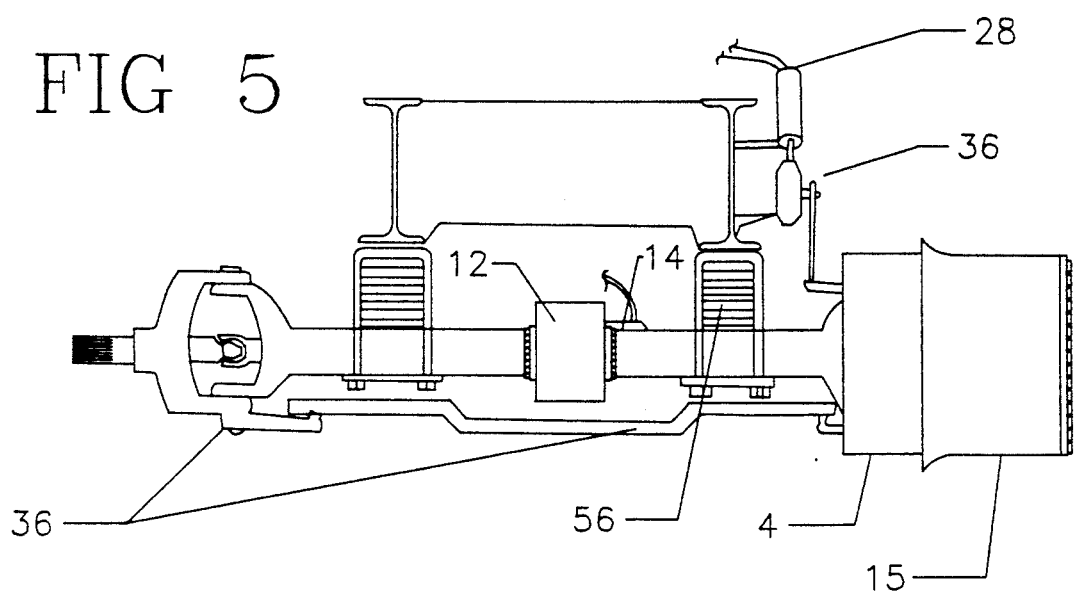
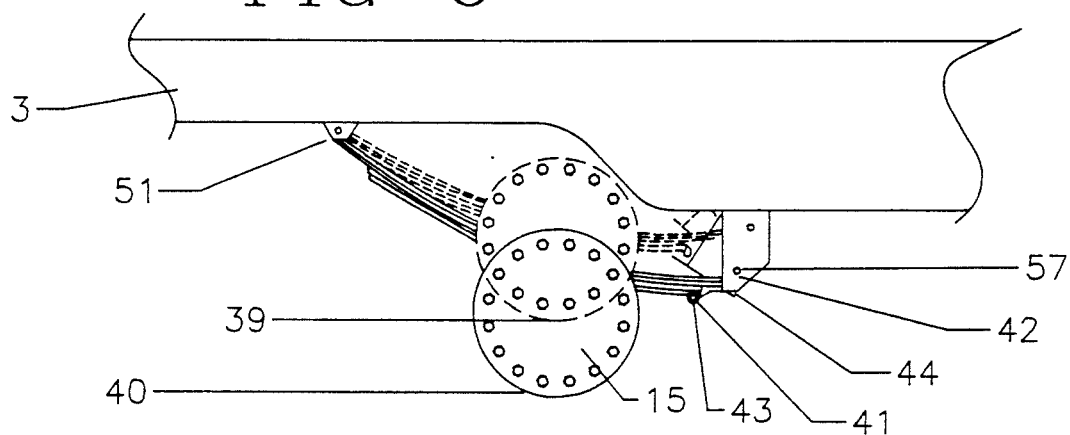
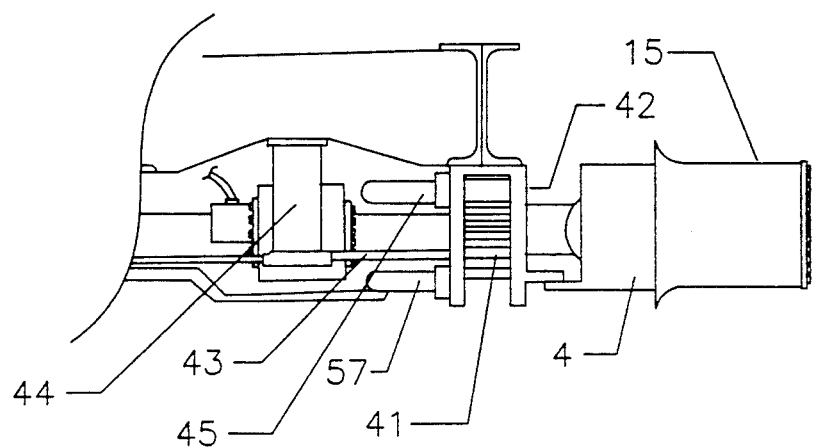

DETACHABLE ALL TERRAIN TRAILER

BRIEF SUMMARY

Tractor-Trailers can transport higher legal payloads than straight chassis commercial trucks, however, T-T's have much less manueverability, particularly in off-highway terrain. This is so because T-T's pivot making them harder to steer and because the trailer wheels are not powered.

In many states, vehicle weight laws are becoming increasingly restrictive making it evermore desirable to transport goods via T-T as often as possible in lieu of using straight trucks.

There are some types of goods which require transportation over rough terrain (typically by an all wheel drive straight truck) the goods generally having to do with construction, mining or logging etc... For goods such as those, the only way to presently utilize the advantage of the greater allowable payload in shipping offered by T-T transportation is to ship to jobsite via T-T and then to transfer the payload to a vehicle capable of traversing the off-highway terrain and placing the cargo in a location convenient to its ultimate use. Needless to say this is not done as a matter of routine for obvious economic reasons.

My invention, the DATT, combines the advantages of T-T's with those of straight trucks. A truck Tractor can transport the DATT over the highway as a semi-trailer bringing it to a jobsite. Once there, the DATT can detach from its carrier within a few minutes and continue to its final destination(s) on its own power acting as, and in many cases better than, a straight truck.

BRIEF DESCRIPTION OF DRAWINGS

FIG. No. 1: A perspective overall view of the DATT

FIG. No. 2: A detailed front view drawing of main drive axle components

Figure 1:
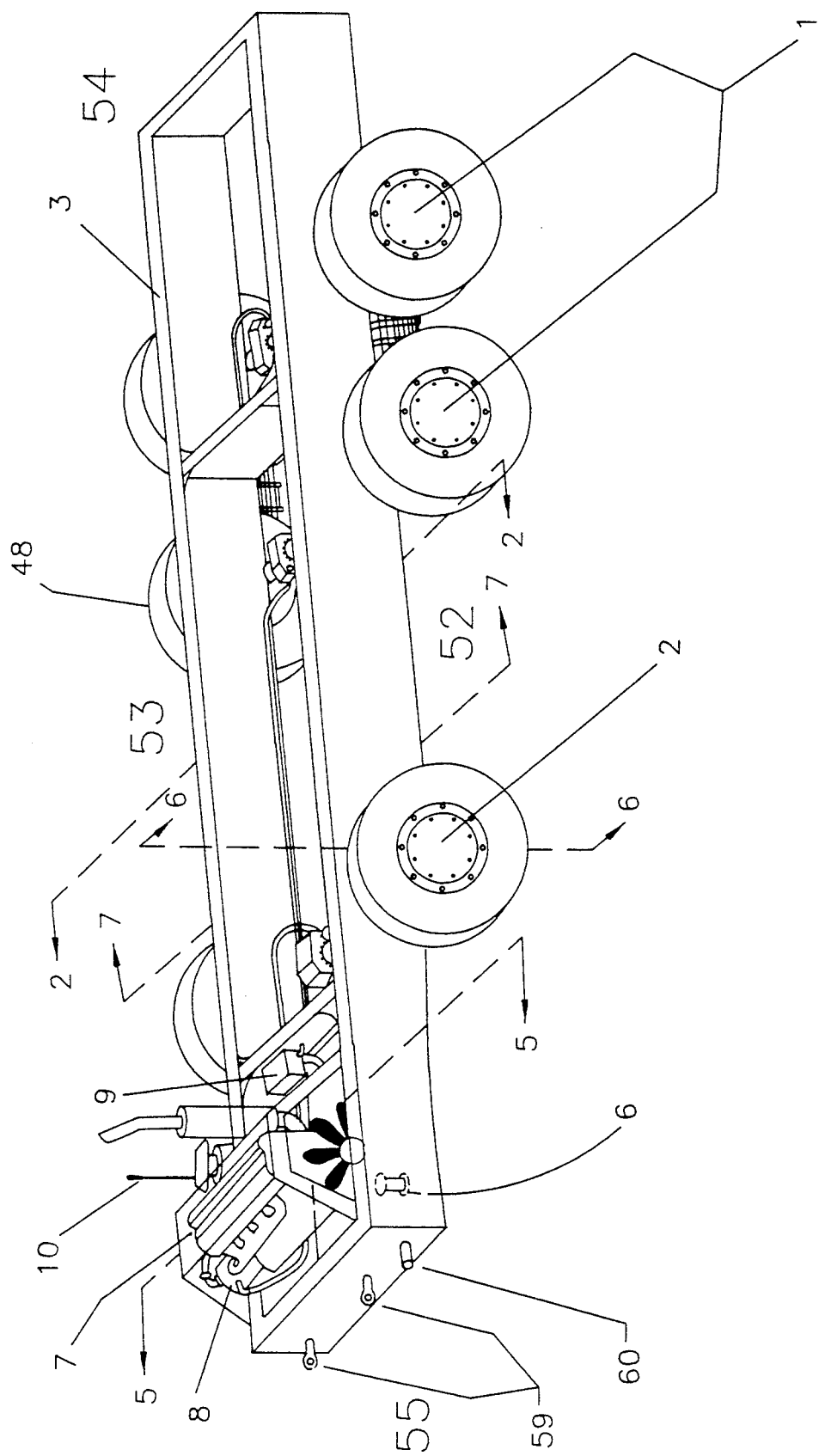
Figure 2:
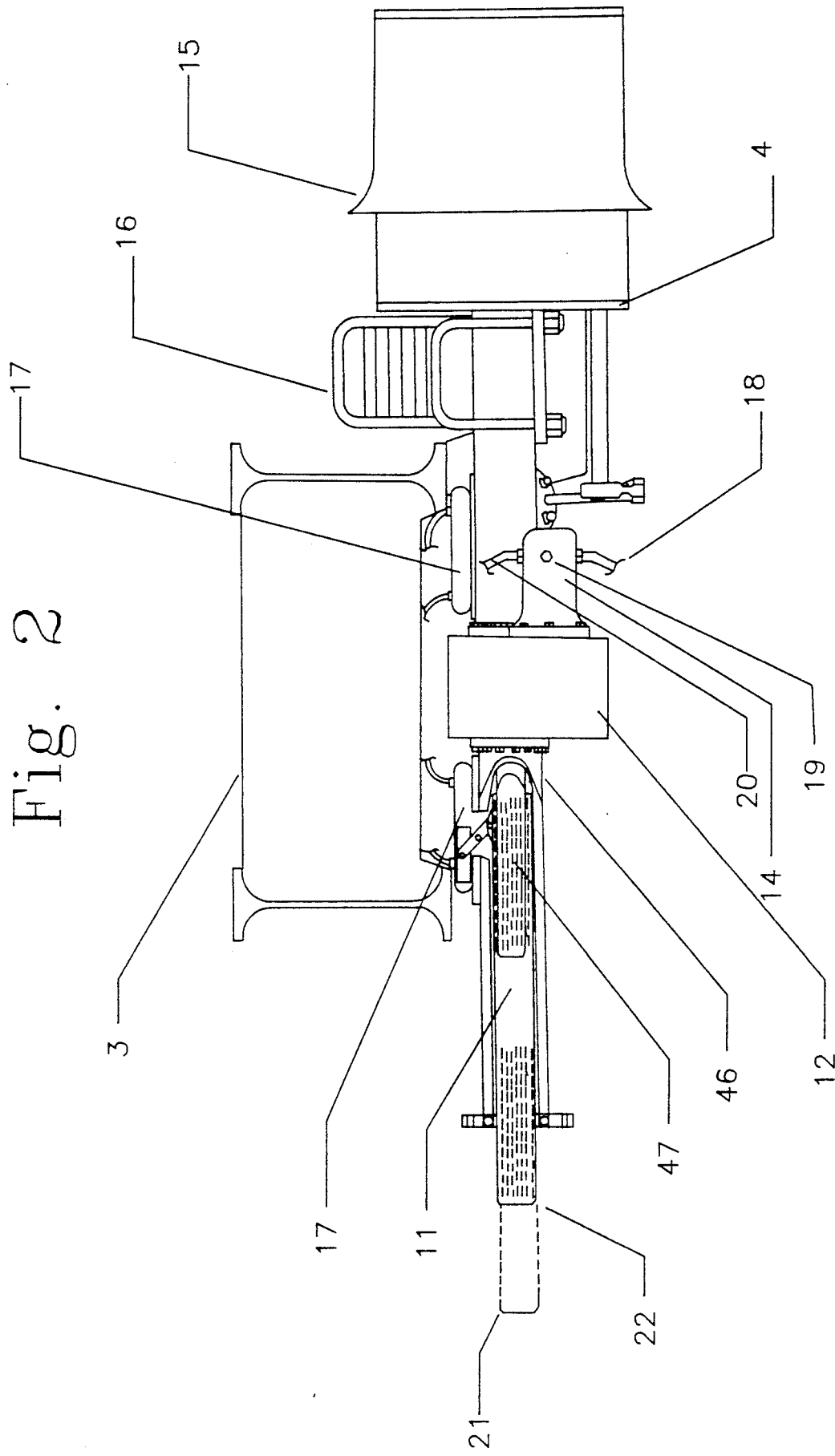
Figure 3:
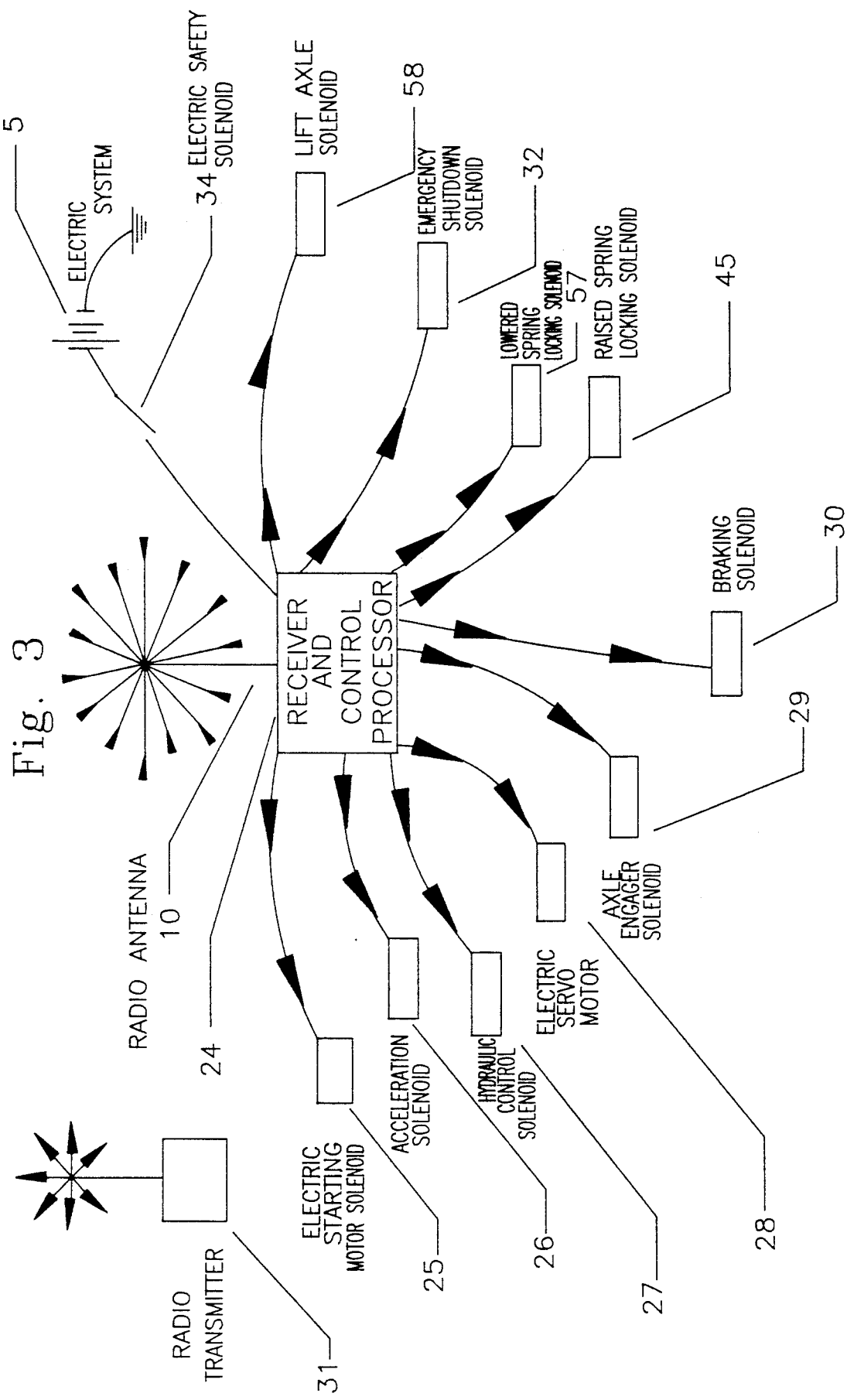
Figure 4:
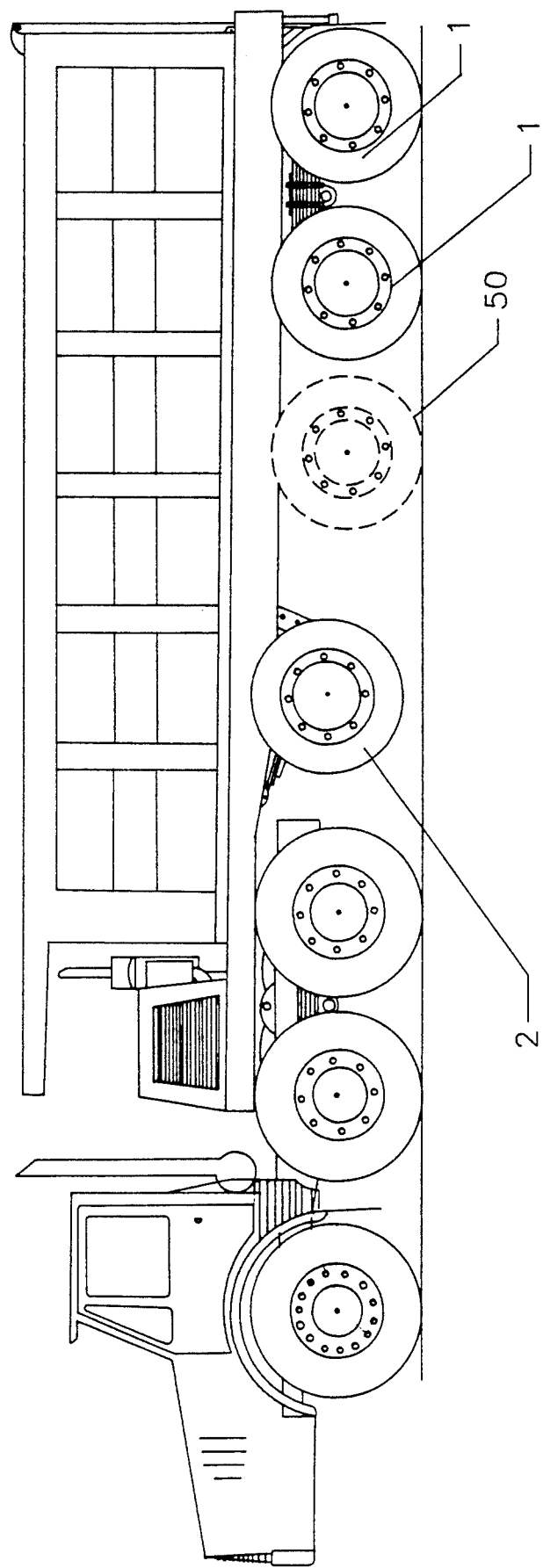

FIG. No. 3: A schematic drawing of the Remote Control System

FIG. No. 4: Left side view of DATT (illustrated with a dumper body mounted on DATT, one of several different types of DATT applications)

FIG. No. 5: Front view of Steering Axle

FIG. No. 6: Left side view of steering Axle (illustrating off-road/on-road positions)

FIG. No. 7: Right rear view of Steering Axle lifting mechanism

DETAILED DESCRIPTION OF THE INVENTION

In FIG. No. 1 we see an overall perspective of the DATT with Left Exterior Side of Semi-Trailer Chassis as 52, Right Exterior Side of Semi-Trailer Chassis as 53, Front of Semi-Trailer Chassis as 55 and Rear of Semi-Trailer Chassis as 54.

The Semi-Trailer Chassis 3 can be made in varying length/width dimensions (whatever is allowable by state motor vehicle laws) and can be made with varying materials such as steel-(other metal) alloy, aluminum, aluminum-(other metal alloy) fiberglass etc...

The Semi-Trailer Chassis 3 can be made to carry any number of payload types and payload containers or bodies, e.g.: flat-beds, freight boxes, cement mixers, dump bodies etc... -basically whatever cargoes are now carried by regular semi-trailers and straight trucks.

The Main Drive Tandem collectively designated 1 and Steering Axle 2 are specially designed so that they can operate off-highway as well as on with equal efficiency. To allow off-highway operation, Steering Axle 2 is located far enough forward on the Semi-Trailer Chassis 3 to allow it to balance and support the weight of the Semi-Trailer Chassis 3 in its detached mode operation.

When a DATT arrives at its destination and is required to traverse rough off-highway terrain, the kind in which a regular T-T would become immobilized, it can detach from its pulling truck tractor, as a semi-trailer normally is detached (by disconnecting the King-Pin 6), and then proceed on its own, powered by an Engine 7 (typically a Diesel). Engine 7 can have a varying range of power rating depending on the particular DATT application but an average would be approximately 300 HP.

The Engine 7 powers the Hydraulic Pump 8 which in turn powers Hydraulic Motors collectively designated 14 (shown in FIGS. No. 2 & 5) which eventually power the Wheel Hubs collectively designated 15 (see FIG. No. 2) of Main Drive Tandem 1 and Steering Axle 2. The Wheel Hubs 15 have tires collectively designated 48 mounted on them. The tires 48 can be of many sizes and design.

While in transport over the highway, the DATT is supplied with air for its standard Air Supply/Braking System collectively designated 4 via Air Supply Connections 59, with pulling truck Tractor.

Once on site, Air Supply Connections 59 are disconnected from the Tractor and air is then supplied via air lines from DATT's own A-S/B System 4 by a standard air compressor typically mounted on an engine which in this case is Engine 7. The A-S/B system 4 can be the same as any in use today, therefore no drawing or reference numerals are provided to describe it other than reference numeral 4 which describes its components collectively.

Likewise, the DATT Electric System 5 is supplied via Electric Connections 60 (with truck Tractor) for over the highway use and off-highway use via DATT Electric System composed of, among other things, the typical 12-volt battery, starter motor, alternator and regulator. The Electrical System 5 can be the same as any in existence today, therefore no drawing or reference numerals are provided to describe it other than reference numeral 5 which describes its components collectively.

Control of the DATT consists of a Remote Control Radio System collectively designated 9 which receives a radio signal via Antenna 10 from a radio signal Transmitter 31 (see FIG. No. 3 for more details on Remote Control System 9).

DETAILED DESCRIPTION

The Transmitter 31 can be one very much like those used by model plane, car and boat hobbyists with means for the particular DATT application desired, therefore no drawing or reference numeral will be used to describe it other than reference numeral 31.

In FIG. No. 2 we see a front view of the forward tandem Main Drive Tandem 1 detailing its major components. Except for the Gear Reduction Box 12, and the Hydraulic Motor 14, all other mechanical components are symmetrically located left and right-those omitted are done so for clarity. Tires 48 are not shown mounted on Wheel Hubs 15 also for clarity of illustration. The rear Main Drive Tandem 1 is identical in construction as the forward one.

When the DATT is taken off-the-highway and is detached from its pulling truck Tractor, the Axle Engaging Solenoid 17, engages the Outer Main Drive Axles 11 with Wheel Hubs 15 as shown by position 21. The outer Main Drive Axles 11 are then driven by the Hydraulic Motors 14, via Gear Reduction Box 12, which receive Hydraulic Fluid under pressure from Hydraulic Pump 8 via Lines 18 and 20 and return Hydraulic Fluid to Hydraulic Pump 8 via Line 19. The mechanics by which the direction and speed of the Hydraulic Motors 14 are controlled are indicated in FIG. No. 3.

The Suspension System collectively designated 16 can be of various types—in this figure it is designated to be made up of steel leaf springs with a load rating of 100,000 lbs—a standard axle suspension system in use today. For sake of completeness, the suspension system is included though it is not of my invention.

In FIG. No. 2, Wheel Hubs 15 are shown as Planetary Gear Reduction Hubs (as used in Crane-Trucks and other construction machinery). An alternative to this could be a more commonly used direct drive hub without planetary gear reduction at the hub.

The Brake Drum (part of the A-S/B system) 4, is shown for completeness and is nothing more than one of the standard components of any truck's Air-Brake system.

In FIG. No. 3 we see a schematic diagram of the Remote Control System 9. Radio signals emanate from a radio transmitter 31 which are then received by Radio Antenna 10 and then processed in the Receiver and Control Processor 24. The R & C Processor 24 sends signals to various solenoids and a servo motor all of which control DATT operation.

The Electric Starting Motor Solenoid 25, causes an electric starter motor of Electric System 5 to be turned on/off in order to start Engine 7.

The Acceleration Solenoid 26 (capable of continuous increments from idle to maximum throttle) is used to accelerate/deaccelerate Engine 7.

The three Hydraulic Control Solenoids collectively designated 27 (four if option 50, an extra Non-Steering Drive Axle, is used) are used to regulate the flow of hydraulic fluid from Hydraulic Pump 8 to Hydraulic Motors 14.

The Electric Servo Motor 28 drives a standard Mechanical Steering System collectively designated 36, for steering the Steering Axle 2. The Axle Engager Solenoids collectively designated 29 switch on/off an air valve in A-S/B system 4 which in turn supplies air to Axle Engager/Disengager 17.

The Emergency Shutdown Solenoid 32, shuts down Engine 7 and applies Braking Solenoid 30.

The Electric Safety Solenoid 34 prevents DATT activation until truck Tractor is separated. It does this by preventing Electric System 5, from starting Engine 7, or from releasing King Pin 6, or from releasing air brakes in A-S/B system 4.

The Raised Spring Locking Solenoid 45 locks/unlocks Actual Rear Hinge 42 of Leaf Springs 56, of Steering Axle 2 (Please see FIGS. 6 & 7) when in raised position. Likewise, for Lowered Spring Locking Solenoid 57 for the lowered position.

The Lift Axle Solenoid 58 controls the position of an air valve in A-S/B system 4 which supplies air to Lift Piston 44 causing it to lift or lower Steering Axle 2 (please refer to FIGS. No. 6 & 7).

In FIG. No. 4 we see a side view of a DATT connected to its pulling truck Tractor. This figure shows the DATT in a Dump Body application—which is just one of its possible applications. The figure is made to help illustrate what a DATT looks like and what it can do.

An Extra Lift Drive Axle 50 is shown here as a possible option. This optional axle has all the same components as Steering Axle 2 except the steering components—Steering Mechanism 36. As a result it does not steer but rather can be used to provide extra safety in meeting weight laws in on-highway uses and extra traction and safety in off-highway uses.

In FIG. No. 5 we see a front view of the Steering Axle 2. This view shows how Servo Motor 28 drives Steering Mechanism 36 to steer the Steering Axle 2. All other components seen in this view have been previously described except the mechanism that raises/lowers Steering Axle 2. Again, as done in FIG. No. 2 except for Gear Reduction Box 12 and Hydraulic Motors 14, all components are symmetrical. In addition, Tires 48 are not shown mounted to Wheel Hubs 15 to aid in clarity of illustration.

In FIG. No. 6 a Left view of Steering Axle 2 in the Lowered Position 40 is shown. The Leaf Springs 56 are permanently hinged at the Front Hinge 51 and hinged (when in the lowered position 40) at Rear Hinge 42 with locking shaft from Lowered Spring Locking Solenoid 57. Steering Axle 2 is lowered by a Lift Piston 44 which is attached to a Lifting Rod 43 that connects to False Hinge 41. Again the Tires 48 are not displayed in an effort to aid in clarity of illustration.

In FIG. No. 7 a Rear view of Steering Axle 2 in the Raised Position 39, is presented. The Raised Spring Locking Solenoid 45 engages locking shaft into Rear Hinge 42. Again components are symmetrically located left and right and Tires 48 are not displayed.

I claim:

1. A self-propelled independently controlled semi-trailer, whereby commercial cargoes can be safely and efficiently transported over roadways and then delivered to off-road sites without first transferring the cargo onto off-road type straight-trucks, comprising:

(a) a semi-trailer chassis having a plurality of permanently mounted stationary and retractable axles with non-steerable rotatable wheels attached, said wheels positioned at either exterior side of said semi-trailer chassis for enabling said semi-trailer chassis to roll on a surface;

(b) an engine mounted in said semi-trailer chassis for producing rotational energy;

(c) a retractable axle, with steerable wheels attached at either end of said retractable axle and located on either exterior side of said semi-trailer chassis, said retractable axle mounted far enough forward to allow it to balance and support said semi-trailer chassis and its cargo once said semi-trailer chassis detached from its pulling truck-tractor and begins its detached mode operation;

(d) means for controllably coupling rotational energy from said engine to one or more of said permanently mounted, stationary and retractable, steerable and non-steerable, rotatable semi-trailer chassis wheels, during said semi-trailer chassis detached mode operation;

(e) means for controlling all operations of said semi-trailer chassis in its detached mode operation independently of the operation of its pulling truck-tractor, which includes:
  (i) starting or shutting-off said engine,
  (ii) accelerating/deaccelerating said engine,
  (iii) causing said semi-trailer wheels to rotate at variable speeds in either forward or reverse direction thus propelling said semi-trailer chassis,
  (iv) steering of said steerable wheels,
  (v) braking said rotatable steerable and non-steerable wheels,
  (vi) controlling all functions of any particular cargo body mounted on said semi-trailer chassis.

2. The method of transporting goods via a semi-trailer whereby after traversing paved roadways said semi-trailer detaches from its pulling truck-tractor at a destination delivering or picking up said goods under its own power, traction and control, independent of its pulling truck-tractor, over rough unpaved terrain, comprising the steps of:
  (a) transporting the said semi-trailer, as a normal semi-trailer over paved roads, to an unpaved rough terrain delivery or pick-up destination,
  (b) manually or mechanically disconnecting the king-pin of said semi-trailer allowing separation of said semi-trailer from the said truck-tractor,
  (c) controlling all of said semi-trailer operation by means of remote-control, which consists of:
    (i) lowering a forward mounted retractable axle of said semi-trailer, with steerable wheels attached, prior to actual separation of said semi-trailer from said truck-tractor,
    (ii) starting an engine, capable of producing rotational energy, mounted on said semi-trailer,
    (iii) engaging a powertrain of said semi-trailer so as to couple the rotational energy of said engine to one or more permanently mounted rotatable wheels of said semi-trailer, and proceeding away from the said pulling truck-tractor to traverse both paved roadway and rough off-highway terrain,
    (iv) steering of said steerable wheels of said semi-trailer, as necessary,
    (v) braking of said semi-trailer rotatable wheels, as necessary,
  (d) reconnecting said semi-trailer with said truck-tractor and relocking said king-pin,
  (e) transporting said semi-trailer from delivery/pick-up destination over paved roadways as a semi-trailer.

* * * * *